No. 776,087. PATENTED NOV. 29, 1904.
R. ROBITSCHEK.
SURGICAL BANDAGE AND MATERIAL FOR MAKING SAME.
APPLICATION FILED MAY 23, 1904.
NO MODEL.
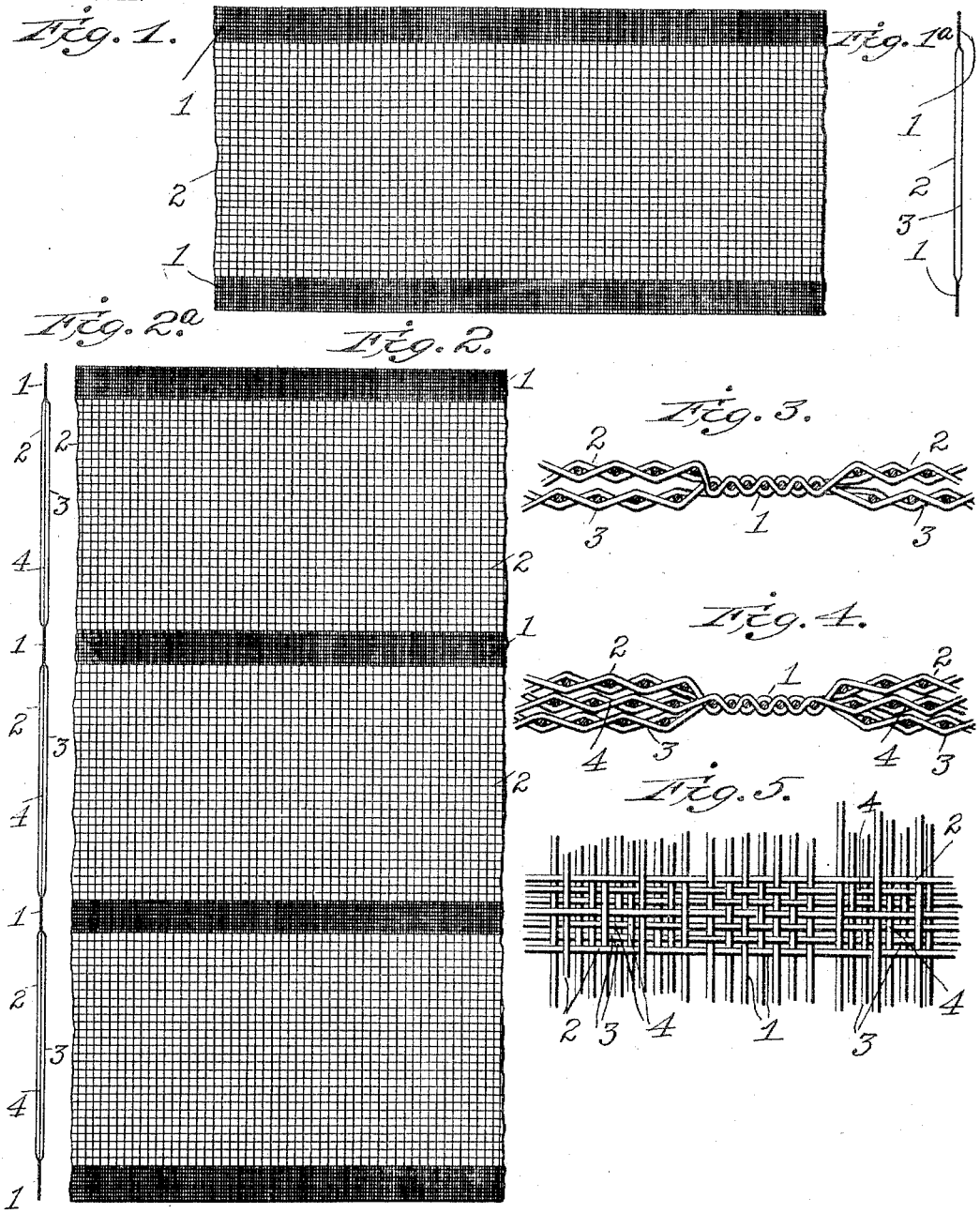
Witnesses
Edwin L. Yewell
J. H. Burgess Jr.
Inventor
Rudolf Robitschek
By W. Schoenborn
Attorney No. 776,087. Patented November 29, 1904.

UNITED STATES PATENT OFFICE.

RUDOLF ROBITSCHEK, OF VIENNA, AUSTRIA-HUNGARY.

SURGICAL BANDAGE AND MATERIAL FOR MAKING SAME.

SPECIFICATION forming part of Letters Patent No. 776,087, dated November 29, 1904.

Application filed May 23, 1904. Serial No. 209,291. (No model.)

*To all whom it may concern:*

Be it known that I, RUDOLF ROBITSCHEK, a subject of the Emperor of Austria-Hungary, residing at Vienna, Austria-Hungary, have invented certain new and useful Improvements in Surgical Bandages and Material for Making the Same, of which the following is a specification.

My invention relates to a new and useful surgical bandage and an improved material from which such bandages of any desired width and length may be obtained.

The objects of my invention are, first, to form a bandage composed of a plurality of superposed layers of loose and light open fabric, the said layers being connected at their outer edges or at any number of intermediate and parallel lines; second, to construct a cheap and compact form of material from which the bandages may be readily cut of any desired width or length; third, to construct the cutting strips or lines of connection of the ribbon bandages in the piece of material so that the material after being severed will not freely unravel and the edges of the bandages will always remain intact while in use in order to firmly and securely hold the superposed layers of fabric in their proper relation to each other to form a highly efficient and comfortable bandage; fourth, to stagger and arrange the threads of the superposed layers of fabric composing the bandage in order to make an easily-yielding, light, and yet porous bandage.

The invention consists of features which will be hereinafter more particularly described, and specifically pointed out in the appended claims.

Referring to the drawings, in which similar characters indicate the same parts in the several figures, Figure 1 is a plan view of a bandage comprising a single width and having two superposed layers of fabric. Fig. 1ª is an end view of the same. Fig. 2 is a plan view of the material comprising a plurality of connected ribbons or widths having three superposed layers. Fig. 2ª is an end view of the material shown in Fig. 2. Fig. 3 is an enlarged sectional view through the line of connection of the bandage-ribbons when two superposed layers are used. Fig. 4 is an enlarged sectional view through the line of connection with three superposed layers. Fig. 5 is an enlarged plan view of a section of the material at the line of connection and showing three superposed layers.

Referring to the drawings, 1 represents the strips or lines of connection of the plurality of superposed layers of woven fabric.

2 is the upper and 3 the lower layer of fabric; 4, (see Figs. 2ª, 4, and 5,) the intermediate layer when three superposed layers are used to form the bandage.

The material from which the bandages are cut (see Figs. 3, 4, and 5) is woven or constructed so that the warp-threads of the superposed layers 2, 3, and 4 are held together by means of the closely-placed weft-threads which form the connecting-strips 1 1. By this arrangement there is formed a series of ribbons of fabric composed of superposed layers and connected at their edges by densely-woven and integral connecting-strips 1 1. From this mode of construction and weave it will be seen from Fig. 5 the weft-threads of layer 2 are staggered with respect to those of the other layers, 3 and 4, and, as shown in Fig. 4, the warp-threads of the layers 2, 3, and 4 are likewise staggered, and instead of the threads being directly under each other and forming an unyielding and compact material they are by my arrangement and invention made to form a yielding, soft, and yet porous material, which is one of the first requisites of a good bandage.

If the material is examined by looking through the same when held up to the light, it will appear as a single closely-woven fabric, and the layers thus superposed and connected form a loose, light, and open fabric especially adapted for bandages. The threads of the superposed layers 2, 3, and 4 are not only staggered, but at the same time are firmly connected and held at their edges by the formation of the densely-woven strips which prevent them from shifting when rubbing against each other and insures a bandage entirely free from creases or balled sections of material, which are commonly found when they are made of superposed strips of fabric in the usual way and which creases or balls cause much discomfort to the patient.

While I have shown in the drawings only three ribbons or sections connected by the strips evenly spaced, it will be readily understood that the number of connected ribbons or the width of the ribbons can be varied in the same piece. It will also be seen that any desired number of superposed layers can be connected together in the above-described manner. An antiseptic may be placed between the layers of the fabric when so secured. When one desires to obtain a bandage of a certain size, all that is necessary is to cut the above-described material at such a densely-woven strip or seam corresponding to the desired width and a distance along such strip corresponding to the length of the bandage. If a single-width bandage is required, any length may be readily obtained with its edges fully protected, as shown in Fig. 1 and described above.

Various changes or modifications may be made in the details of the bandage and material without departing from the spirit of my invention.

Having now fully described my invention, what I claim as new, and desire to secure by Letters Patent, is—

1. A surgical bandage, comprising a plurality of superposed layers of loose and light open fabric having their outer edges connected with a closely-woven and integral section of material of the bandage, the closely-woven section having raw edges.

2. A surgical bandage, comprising a plurality of superposed and staggered layers of loose and light open fabric having their outer edges connected with a closely-woven and integral section of material of the bandage, the closely-woven section having raw edges.

3. A surgical bandage, comprising a plurality of superposed and staggered layers of loose and light open fabric having their outer edges and intermediate parallel lines connected with a closely-woven and integral section of material of the bandage, the closely-woven section having raw edges.

4. A material for surgical bandages of variable width comprising sections each composed of a plurality of superposed layers of loose and light open fabric connected together on parallel and separated lines by strips of closely-woven fabric.

5. A material for surgical bandages of variable width comprising sections each composed of three superposed layers of loose and light open fabric connected together on parallel and separated lines by strips of closely-woven fabric.

6. A material for surgical bandages of variable width comprising sections each composed of a number of superposed layers of loose and light open fabric, the said layers being connected together by means of densely-woven warp and weft threads at places intermediate the length of the material and corresponding to the required width of the bandages.

In testimony whereof I have hereunto set my hand in presence of two subscribing witnesses.

RUDOLF ROBITSCHEK.

Witnesses:
ALVESTO S. HOGUE,
JOSEF RUBARCH.